US009336418B2

(12) United States Patent
Hussain (10) Patent No.: US 9,336,418 B2
(45) Date of Patent: May 10, 2016

(54) SYSTEM AND METHOD FOR POLLING NFC-A DEVICES ALONGSIDE RF BARCODE DEVICES

(71) Applicant: STMicroelectronics International N.V., Amsterdam (NL)

(72) Inventor: Jafer Hussain, Singapore (SG)

(73) Assignee: STMicroelectronics International N.V., Amsterdamn (NL)

( * ) Notice: Subject to any disclaimer, the term of this patent is extended or adjusted under 35 U.S.C. 154(b) by 90 days.

(21) Appl. No.: 14/332,994

(22) Filed: Jul. 16, 2014

(65) Prior Publication Data

US 2015/0024683 A1 Jan. 22, 2015

(30) Foreign Application Priority Data

Jul. 17, 2013 (EP) .................................... 13176840

(51) Int. Cl.
| | |
|---|---|
| H04B 5/00 | (2006.01) |
| G06K 7/10 | (2006.01) |
| H04W 28/04 | (2009.01) |
| H04W 76/02 | (2009.01) |

(52) U.S. Cl.
CPC ........ *G06K 7/10039* (2013.01); *G06K 7/10128* (2013.01); *G06K 7/10138* (2013.01); *G06K 7/10297* (2013.01); *H04B 5/0031* (2013.01); *H04B 5/0062* (2013.01); *H04W 28/044* (2013.01); *H04W 76/023* (2013.01); *G06K 7/10237* (2013.01)

(58) Field of Classification Search
CPC .......................... G06K 7/10039; G06K 7/0008
See application file for complete search history.

(56) References Cited

U.S. PATENT DOCUMENTS

| | | | | |
|---|---|---|---|---|
| 2006/0120303 | A1* | 6/2006 | Yarvis | H04L 12/12 370/254 |
| 2009/0021353 | A1 | 1/2009 | Nonaka | |
| 2010/0138481 | A1* | 6/2010 | Behrens | H04L 12/58 709/203 |
| 2012/0088487 | A1* | 4/2012 | Khan | H04W 4/001 455/418 |
| 2013/0005242 | A1* | 1/2013 | Royston | G06K 7/10138 455/41.1 |
| 2013/0029686 | A1* | 1/2013 | Moshfeghi | G01S 19/48 455/456.1 |
| 2013/0295843 | A1* | 11/2013 | Tian | H04B 5/00 455/41.1 |
| 2014/0273831 | A1* | 9/2014 | Walton | E21B 47/122 455/41.1 |

FOREIGN PATENT DOCUMENTS

| | | |
|---|---|---|
| EP | 1630714 A2 | 3/2006 |
| EP | 1959579 A1 | 8/2008 |

OTHER PUBLICATIONS

EPO Search Report for EP 13176840.0 mailed Dec. 9, 2013 (4 pages).

\* cited by examiner

*Primary Examiner* — Wesley Kim
*Assistant Examiner* — Richard Chan
(74) *Attorney, Agent, or Firm* — Gardere Wynne Sewell LLP (57) ABSTRACT

A NFC reader is connected for communication to NFC devices such as an NFC-A device and an RF barcode device. The reader detects and logs the active and sleep intervals of the RF barcode device in response to receipt of periodically received UID communications. The transmission and reception of data to and from each NFC-A device is then synchronized to occurs only when the RF barcode device is in a sleep interval between UID communications.

17 Claims, 5 Drawing Sheets

SYSTEM AND METHOD FOR POLLING NFC-A DEVICES ALONGSIDE RF BARCODE DEVICES

PRIORITY CLAIM

This application claims priority from European Patent Application No. 13176840.0 filed Jul. 17, 2013, the disclosure of which is incorporated by reference.

TECHNICAL FIELD

This invention relates to Near-Field Communication (NFC) and in particular, but without limitation, to the coexistence of different types of NFC device, such as RF barcode-type devices and another NFC-enabled device.

BACKGROUND

Near-field communication (NFC) is a short-range wireless communication technology that is used for exchanging data between devices over short distances of up to a few tens of centimeters.

NFC is used in many types of so-called contactless devices, such as travel cards, credit cards and the like. In addition, NFC can be used in radio-frequency identification (RFID) applications whereby a reader device can detect and retrieve data from an NFC tag. RFID devices comprise an antenna, which is used for the transmission and reception of radio signals (data), and as an induction loop for powering the device, whereby the NFC tag is able to be powered by an RF induced current in its antenna as it resides within the RF field of the reader device.

NFC devices communicate via magnetic field induction whereby the loop antenna of the reader device and the loop antenna of the NFC device are located within each other's near field, effectively forming an air-core transformer. By such a configuration, it is possible to transmit data and power from one device to the other.

There are generally two modes of NFC: a passive communication mode whereby the initiating device provides a carrier field and the target device answers by modulating the carrier field; and an active communication mode where both the initiating and target devices communicate by alternately generating their own fields.

The target device can be a smartcard or a tag, but also more advanced devices, such as mobile phones can have NFC functionality whereby they "emulate" the behavior of an NFC tag. For this reason, when the target device operates in passive communication mode, this is usually called a "tag emulation mode" and the target device can be called a "tag emulator" or "transponder". Such devices can communicate with one another according to operations and protocols defined by the ISO 14443 standard. A problem can arise, however, where more than one NFC reader and/or target are in range of one another, because this can lead to data collision and unnecessary bandwidth being used.

Specifically, certain types of passive NFC tags can cause coexistence problems in NFC environments. Specifically, one type of NFC tag, which is an RF barcode-type device developed and marketed by the company Kovio™, (commonly referred to as a "Kovio tag"), comprises a printed integrated circuit (PIC) comprising an antenna, a master circuit, a transponder and a 128-bit ROM.

The ROM is loaded with a unique identification code (UID), and the device operates in a passive, read-only mode. As such, when the RF barcode device enters the RF field of a reader device, it is powered-up and by an induction current in its antenna, and then proceeds to broadcast its 128-bit code (the UID) at intervals. In other words, the RF barcode device operates in a Tags-Talk-First (TTF) mode, it does not accept any commands from a reader but rather, as soon as it receives enough power from the reader's field to operate, it repeatedly transmits its UID at a specific interval, as long as it is powered.

Specifically, an RF barcode device is configured to begin broadcasting its UID within 1 ms of entering the RF field (or the RF field being switched on). It takes approximately 1.21 ms to broadcast the 128-bit UID, assuming a bit rate of 106 kbps, and this process is repeated every 3.6 ms (the "sleep duration") as long as the RF field is present, as depicted in FIGS. 1 and 2 of the drawings.

Figure 1:
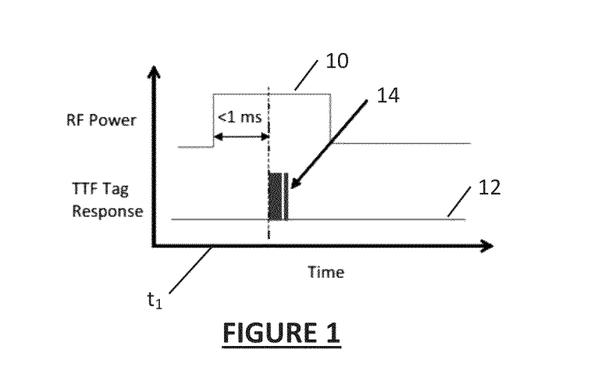
FIG. 1 is a signaling diagram showing the operation of an RF barcode-type device.

In FIG. 1, which shows the RF field 10 and the RF barcode device response 12 as a function of time on the horizontal axis, it can be seen that the RF field is initially OFF, but after time t1, it is switched on. The RF barcode device is powered-up and activated by the RF field, and within 1 ms of t1, begins broadcasting its UID 14.

Figure 2:
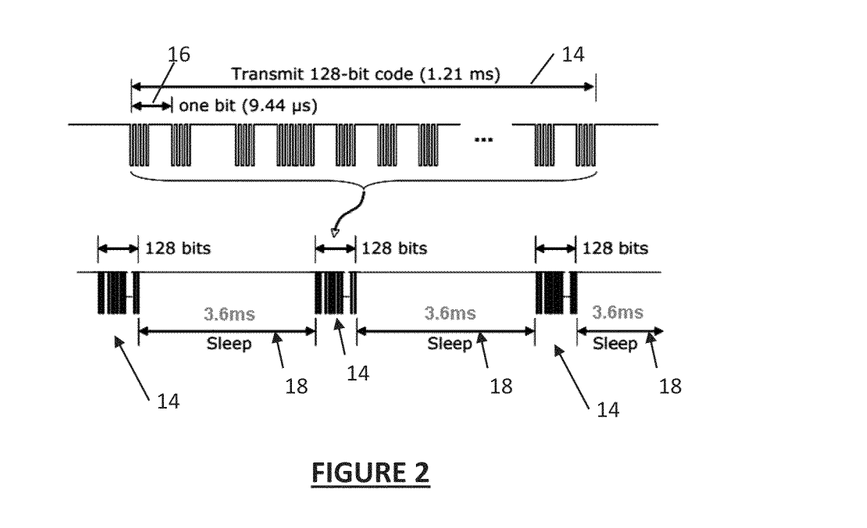
FIG. 2 is a detailed, and extended, view of FIG. 1.

As can be seen from FIG. 2 more clearly, the UID 14 is made up of a number of pulses representative of the UID. Each bit 16 takes 9.44 µs to transmit, so a 128-bit UID takes 1.21 ms to transmit, assuming a bit rate of 106 kbps. The sleep interval 18, i.e. the wait time between successive UID transmissions 14, is 3.6 ms.

On the other hand, NFC-A tags (or other listen mode devices) work in a Request-Response mode, and therefore wait for an NFC-A Poll Request from an NFC reader device before transmitting the NFC-A Poll Response.

For the avoidance of doubt, NFC Forum "Type-1 Tag" (T1T), "Type-2 Tag" (T2T) and "Type-4A Tag" (T4AT) are all based on NFC-A technology. As such, the terms "NFC-A tag" and "NFC-A listen mode devices" are essentially the same. NFC-DEP based peer-to-peer (P2P) target devices may also be based on NFC-A technology.

As such, until the RF barcode device leaves the RF field, it will continue to broadcast its UID. Moreover, because the RF barcode device cannot accept a power-down command from the reader device, to halt, or pause, the RF barcode device's UID transmission, other NFC traffic, for example, between the reader and other NFC-A devices is adversely affected.

At present, there are no guidelines for reading RF barcode-type devices alongside other NFC-A devices (in reader mode or card emulation mode) and the fact that the RF barcode device, by design, repeatedly broadcasts its UID, can cause data collisions or adversely affect the stability of the reader device, which degrades the user experience.

Figure 3:
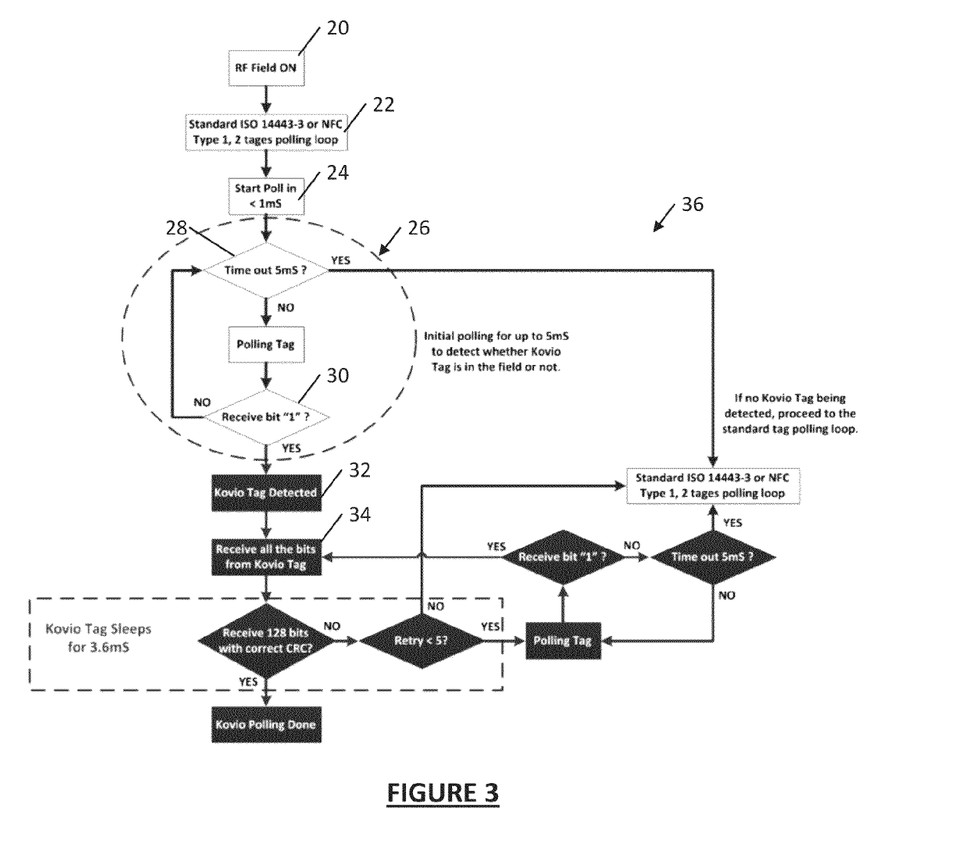
FIG. 3 is a schematic flowchart showing the reconciliation of RF barcode devices and NFC-A devices in an NFC environment.

The reason for this is that the Kovio standard specification, as shown in FIG. 3, imposes a guard time of 5 ms for polling the NFC-A tags. This means that when the RF field is switched on, the RF barcode devices activate within 1 ms, whereas other NFC-A devices are not polled until 5 ms after switching on the RF field. The problem is that when an RF barcode type device (e.g. a "Kovio tag") is detected by an NFC reader, the NFC reader cannot poll for NFC-A tags. As a result, the NFC reader will switch OFF the RF field upon detection of only RF barcode devices, resulting in a bad user experience because the NFC reader won't detect any NFC-A tags even though NFC-A tags may be present in the RF field.

Referring to FIG. 3, the sequence commences by switching ON 20 the RF field, whereupon the ISO 14443-3 polling loop protocol is initialized 22. Within 1 ms, 24, polling begins, which starts a "seek" procedure 26. During the seek procedure 26, a guard time 28 of 5 ms 28 is waited-out. If an RF barcode device is present in the RF field, i.e. if the NFC reader receives the $1^{st}$ bit 30 before the expiry of the 5 ms guard time 28, then the RF barcode device is deemed "detected" 32 and the remainder of the UID is obtained 34.

On the other hand, if 5 ms guard time 28 expires without detecting an RF barcode device, then the NFC reader will proceed to poll for NFC-A devices in the usual way 36.

As can be seen from FIG. 3, the NFC reader will proceed to poll for NFC-A tags 36 only if it does not detect an RF barcode device within 5 ms 28 of switching ON the RF field.

A need therefore exists for a solution that makes it possible for RF barcode-type devices to coexist with other types of NFC devices in an NFC environment, for example, enabling RF barcode devices and other ISO 14443-compliant devices to cohabit and interoperate in parallel with a common reader device.

SUMMARY

According to a first aspect, there is provided a method of connecting an NFC reader to a plurality of NFC devices, the plurality of NFC devices comprising at least one NFC-A device and at least one RF barcode device, the method comprising the steps of: detecting and logging the active and sleep intervals of the RF barcode device when an RF field is switched on; and synchronizing the transmission and reception of data to, and from, the or each NFC-A device such that transmission and reception of data to, and from, the or each NFC-A device occurs only when the or each RF barcode device is in a sleep interval.

The RF barcode device may be a "Kovio" tag.

Suitably, the step of detecting and logging the active and sleep intervals of the RF barcode device occurs by switching on an RF field which is capable of powering-up the RF barcode device and by listening for a response from the RF barcode device. Upon detection of an RF barcode device in the RF field, the transmission of the RF barcode device's UID is suitably timed. Suitably, a timer or clock is used to time the start and end of the UID transmissions. The start and end times of the UID transmissions are suitably logged, and the log so produced is suitably stored in a memory device. From the log, the duration and period of the RF barcode device's UID transmissions is suitably determinable.

The detection of RF barcode devices is suitably performed prior to the detection of other NFC-A devices. A guard time is suitably employed, say of 5 ms duration, during which the NFC reader is configured to search only for RF barcode devices, and after which guard time, the NFC reader is configured to search for other NFC-A devices. If no RF barcode devices are detected within the guard time, the NFC reader may be adapted to operate in a conventional NFC mode of operation, that is to say, according to the NFC-A standard. However, if an RF barcode device is detected within the guard time, the NFC reader is suitably adapted to operate in a synchronous mode, that is to say, whereby the exchange of data with NFC-A devices is synchronized to occur only within the sleep intervals of the RF barcode device, that is to say, in the intervals between successive UID transmissions of the RF barcode device.

A second aspect provides an apparatus for connecting an NFC reader to a plurality of NFC devices, the plurality of NFC devices comprising at least one NFC-A device and at least one RF barcode device, the apparatus comprising: an RF transceiver, a clock and a processor, the processor comprising: means for detecting the RF barcode device when the RF transceiver is active; and means for monitoring the RF barcode device's UID transmissions, wherein the clock and processor are together configured to monitor the period and duration of the RF barcode device's UID transmissions, wherein the processor is configured to poll for and/or to exchange data with the NFC-A device only in the intervals between the end of a first, and the beginning of a second UID transmission by the RF barcode device.

The apparatus may comprise a unitary NFC reader, or in certain embodiments, an RF field capable of powering-up the RF barcode device may be produced by a separate source. The RF transceiver suitably comprises a transmitter module and a receiver module, which may be integral with one another, or separate.

The clock may comprise a system clock of the processor.

The processor, in one embodiment, comprises hardware, such as a dedicated integrated circuit, or in certain other embodiments, the processor may comprise an application, application layer or software module operable within an operating system of an electronic device, such as a mobile telephone.

The means for detecting the RF barcode device suitably employs the NFC-A standard, whereby a command is broadcast on the RF field. NFC devices present within the RF field, according to the NFC standard, are configured to respond with a response that is detectable by the transceiver of the system.

In the case of an RF barcode device, the response is a UID transmission, and upon detection of the UID, or at least the first bit of the UID, the apparatus is suitably configured to check for the receipt of a complete UID.

The clock is suitably triggered by the commencement and termination of the receipt of the UID, and the clock start/stop times are suitably stored in a memory device of the apparatus. From the log of clock's start/stop times, the processor is suitably configured to calculate the period of the UID transmissions, that is to say, the interval between successive identifiers therein, such as the start or end of the each UID transmission; and the duration of each UID transmission, that is to say, the interval between the start and end of each UID transmission. From these values, the processor is able to predict when the next UID is likely to be received, but more importantly, when the RF barcode device is next going to be inactive, that is to say, not transmitting its UID.

Upon detection of an RF barcode device, therefore, the apparatus configured to begin logging the UID transmissions and to begin predicting the sleep periods of the RF barcode device.

The apparatus is thus able to synchronize its data exchange data with NFC-A devices other than RF barcode devices, in the sleep intervals of any resident RF barcode devices.

As such, embodiments provide a system and technique which permits communication with NFC-A tags during sleep durations (or intervals) of RF barcode devices (Kovio tags) frame periodic transmission. Suitably, therefore, the invention provides a system, method and procedure whereby an NFC reader can poll for, and detect, the presence of NFC-A tags even when an RF barcode device (Kovio tag) is also present in the RF field and also detected by the NFC reader.

BRIEF DESCRIPTION OF THE DRAWINGS

Preferred embodiments shall now be described, by way of example only, with reference to the accompanying drawings in which.

DETAILED DESCRIPTION

Figure 4:
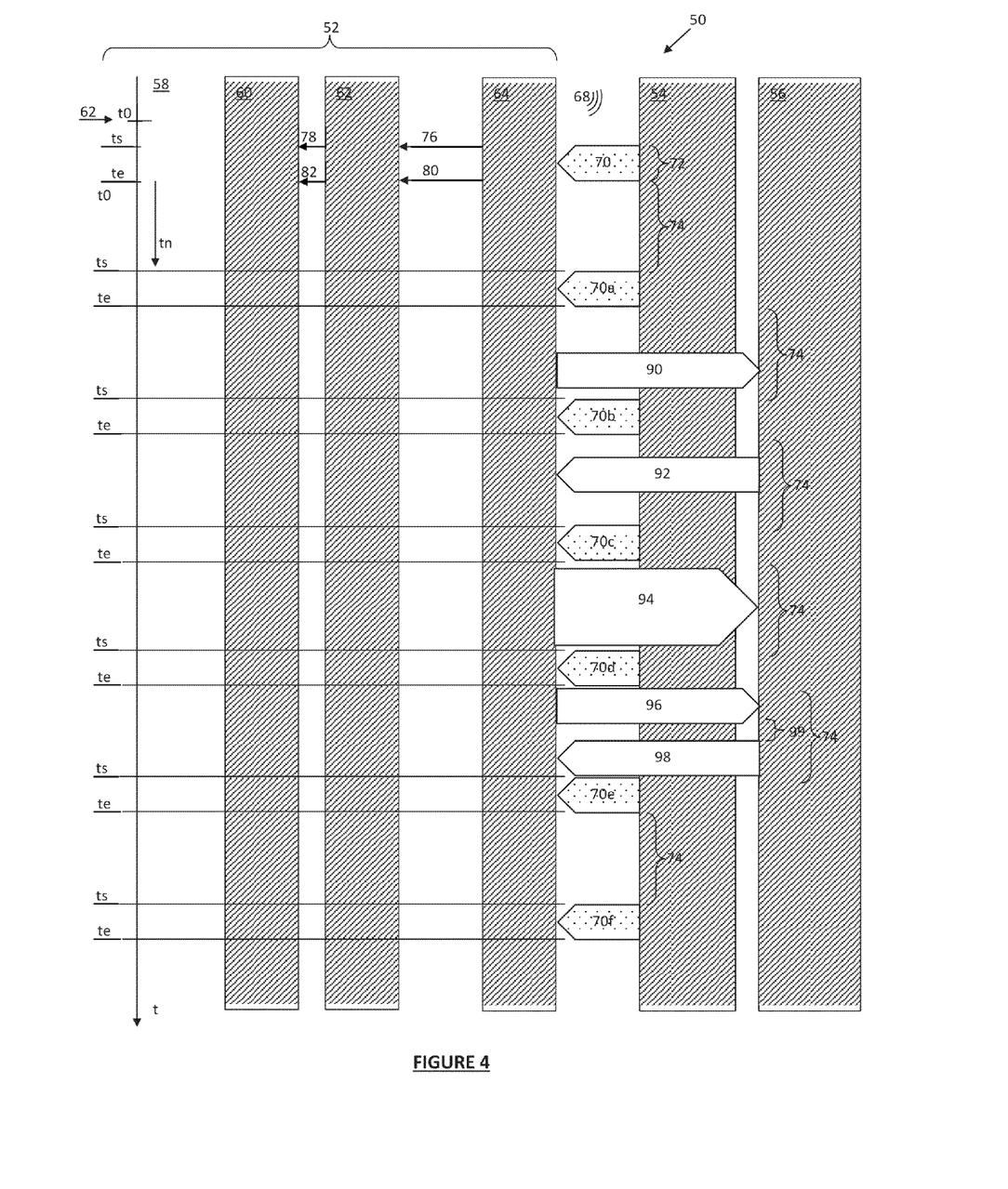
FIG. 4 is a schematic system diagram showing the operation of an embodiment.

In FIG. 4, an NFC environment 50 comprises an NFC reader 52, a RF barcode device 54 and an NFC-A device 56. The NFC reader 52 comprises an NFC interface 58, a memory device 60, a clock 62 and an RF transceiver 64. At t=0, the host (not shown) initiates 66 the NFC interface 58, which switches on the RF field 68. Within 1 ms of t=0, the RF barcode device 54 is powered-up and begins transmitting its UID 70. The duration 72 of the UID 70 is 1.12 ms, and the period is 4.72 ms, meaning that the sleep time 74 is 3.6 ms. The RF barcode device 54 re-transmits its UID 70 at regular intervals. Meanwhile, the reception of the UID 70 triggers 76 the clock 52, and the clock 52 stores 78 the start time is in the memory 60. When the RF barcode device 54 ceases transmitting its UID 70, the clock 62 is triggered 80 once again, and the end time te is recorded 82 in the memory 60.

At this point, the host (not shown) can interrogate the memory 60 to determine the time tn when the next UID 70a will be transmitted, that is to say, at te+the sleep time 74, and its duration, which should be equal to te−ts.

Meanwhile, at t=5 ms, which may be before or after tn, the guard period 76 expires and the NFC interface 58 can begin polling for other NFC-A devices 56 present in the RF field 68. However, because the host (not shown) can determine when the next 70a, and each subsequent UID transmission 70b, 70c, 70d, 70e etc., by interrogating the memory 60 and extrapolating, it can synchronize the transmission of NFC-A traffic 90 to occur during the sleep intervals 74 of the RF barcode device 54.

As can be seen in FIG. 4, the host (not shown) initiates a handshake command 90 with the NFC-A device during a sleep interval 74. The handshake command 90 includes a frame waiting time 99 for the NFC-A device 56, such that the NFC-A device 56 delays responding 92 until the next sleep interval 74 of the RF barcode device 54. As such, the NFC reader 52 is able to initiate and sustain a connection with an NFC-A device 56 in spite of the co-existence of the RF barcode device 54 in the RF field 68.

When the NFC reader 52 wishes to transmit a data packet 94 whose duration will exceed a sleep interval 74, the host (not shown) configures the NFC interface 58 to truncate the packet 94 to fit within the sleep interval 74. As such, a truncated data packet 94 contains a command instructing the NFC-A device to wait for receipt of a subsequent packet 96, completing the transmission. The NFC-A device can also be configured to act likewise, that is to say, to truncate its response 98 to fit within a sleep interval 74 or to wait until the next available full sleep interval 74 before responding. Meanwhile, it will be noted that the clock 62 is being triggered by each UID 70 transmission, and the log 60 updated in real time. Such a configuration safeguards against asynchronous behavior, for example, where the RF barcode device 54 powers-down temporarily (e.g. if it temporarily leaves the RF field 68) or where the RF barcode device moves out of range of the RF field 68 altogether. Notably, the system obeys the frame waiting time 99 for NFC-A communications.

It will be appreciated that where, during the initial seek phase, no RF barcode devices 54 are detected, the NFC reader 52 can operate in a standard mode: communicating as per the NFC standard with the NFC-A device or devices alone.

Figure 5:
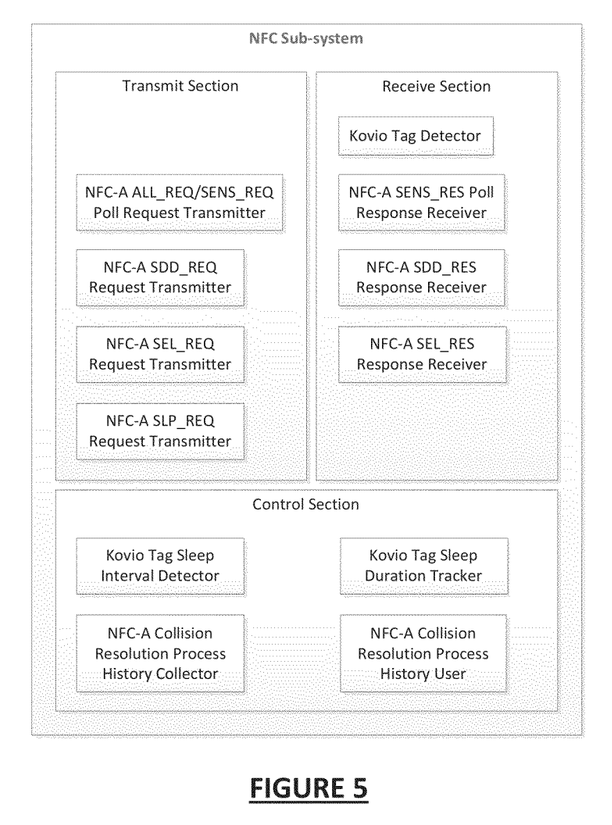
FIG. 5 depicts, diagrammatically, an NFC Sub-system.
Figure 6:
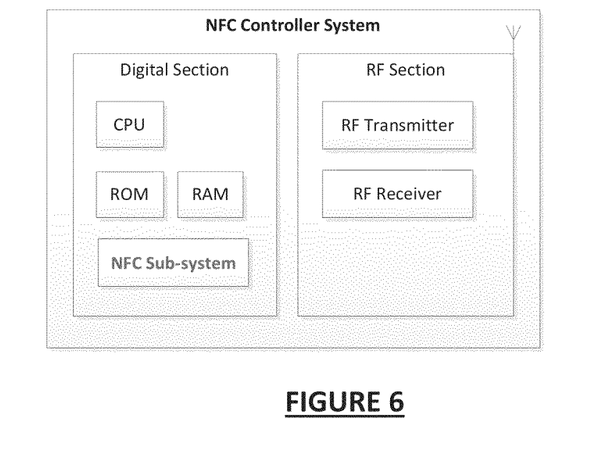
FIG. 6 shows the block diagram of NFC Controller System.

In FIG. 5 is a block diagram showing the NFC interface/sub-system 200 previously described, which comprises a transmit section 100 and a receive section 102. There is also a control section 104, which controls the detection 106 of the sleep intervals 74 and 107 the UID durations 72, and collision resolution modules 108, 110. The NFC-sub system of FIG. 5 resides within the digital section of an NFC controller 58, as shown in FIG. 6, which comprises a CPU 112, memory comprising ROM 114 and RAM 116 and an RF section 118 comprising a transceiver 64.

Figure 7:
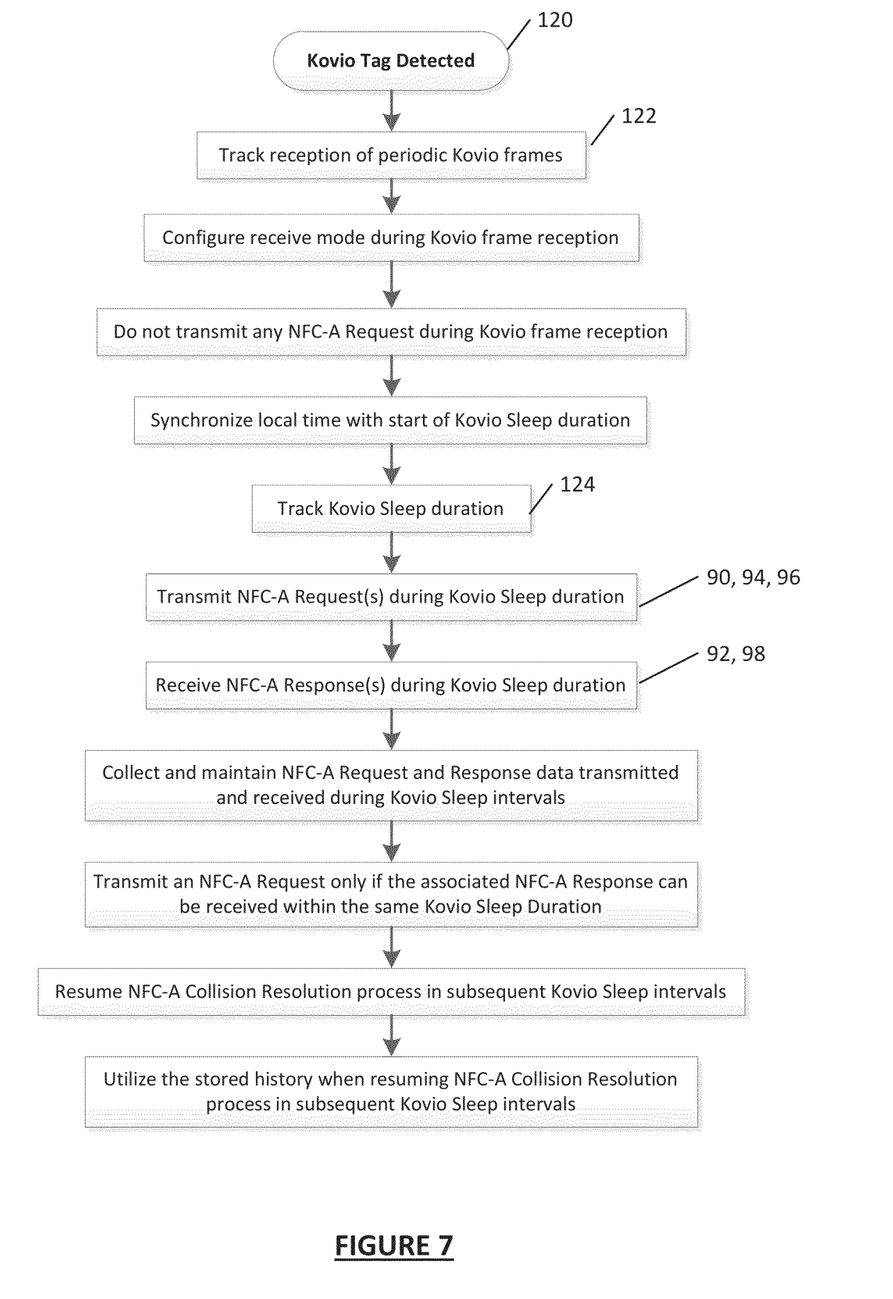
FIG. 7 describes the complete flow and sequence.

FIG. 7 is a flow diagram showing the operation. After the NFC reader switches ON 20 the RF field, it detects 120 the presence of an RF barcode device as described in the "Kovio standard specification". If the NFC reader is configured to poll for NFC-A tags 56, it continues to detect the presence of an RF barcode device 54 up to the expiry of a 5 ms guard time 76.

If no RF barcode device 54 is detected and the 5 ms guard time 76 has expired, the NFC reader 52 proceeds to poll for NFC-A tags 56 as per the NFC-Forum Digital Protocol Specification (Section: NFC-A Technology).

On the other hand, if the NFC reader 52 detects 120 an RF barcode device (i.e. a 128-bit code with a correct CRC is received), then the NFC reader 52 maintains the RF field 68, and tracks the periodic transmissions 122 of UIDs 70 (128-bit code) as well 124 as the sleep intervals 74 (3.6 ms) using internal timers 62. In other words, the NFC reader 52 is aware of the timing of the UIDs 70, and when the RF barcode device 54 enters the sleep state 74 (i.e. no UID 70 transmission).

The data transfer rate for both RF barcode devices and other NFC-A devices is fixed at 106 kbps. Since it takes approx. 9.44 µs to transmit 1-bit at 106 kbps, this means that approximately 381-bits (or at least 47 bytes) can be transmitted or received during each 3.6 ms sleep interval 74.

However, polling for NFC-A devices 56 by an NFC reader 52 occurs in Request-Response pairs, which requires a frame delay time 99 in either direction as per the NFC-Forum Digital Protocol Specification (Section: NFC-A Technology).

Nevertheless, the NFC reader 52 is configured to operate in receive-only mode during UID reception intervals (i.e. between is and te), and so the NFC reader 52 does not transmit (e.g. an NFC-A Request) during UID reception periods.

The NFC reader 52 also synchronizes an internal timer 78, 82 with the start te of every UID sleep interval 74. As such, the NFC reader 52 is able to track the UID sleep duration 74 such that the NFC reader 52 is able to ascertain or determine (predict) when the next sleep to interval 74 will expire and also when the next UID 70 will be received. As such, the NFC reader 52 can be configured to transmit NFC-A requests 90, 94, 96 (e.g. ALL_REQ/SENS_REQ, SDD_REQ, SEL_REQ, SLP_REQ), and to receive responses 92, 98 only during sleep intervals 74.

Moreover, and as described previously, the NFC reader 52 is thus able to collect and maintain NFC-A request and response data transmitted and received during sleep intervals 74. The stored historical data can usefully be used by the NFC reader 52 in subsequent sleep intervals 74 as part of the NFC-A discovery or collision resolution process.

In one embodiment, the NFC reader 52 is configured to refrain from transmitting an NFC-A request 90 if the associated NFC-A response 92 would not be received from the NFC-A listen device 56 within the same sleep interval 74. In such a case, the NFC reader 52 is able to delay the transmission of such NFC-A requests 90 to a subsequent sleep interval 74 to ensure proper operation.

The NFC reader may resume NFC-A discovery or collision resolution process in subsequent sleep intervals 74. The NFC reader may restart the NFC-A discovery or collision resolution in a sleep interval 74 if it deems necessary. Importantly, the NFC reader 52 is able to respect the frame delay timings 99 as set forth in the NFC Forum Digital Protocol Specification (Section: NFC-A Technology).

Other modifications to the basic concept of the invention may include the NFC reader 52: storing historical data (from earlier transactions during sleep intervals 74) in subsequent sleep intervals 74; exchanging data with NFC-A listen devices; informing a user about the presence of an RF barcode device 54 as well as NFC-A listen devices 56 in the RF field 68 so that, say, the user can take an appropriate action thereafter.

The RF barcode device may transmit 128-bit code or 256-bit code in future generations, without affecting the operation.

The system and method of the invention are applicable irrespective of the number of RF barcode devices and NFC-A listen devices present in the RF field 68.

The embodiments may provide a number of possible technical advantages, including: a method of polling for NFC-A listen devices even when an RF barcode device (Kovio Tag) is also present in the RF field and detected by the NFC reader; simplifying the complexity of hardware and/or software implementations in the NFC controller; solving interoperability issues; power efficiency; and a better user experience because a user would not have to remove an RF barcode device from the RF field in order to enable the NFC reader to detect NFC-A tags.

The method can, as described above, be implemented either in software/firmware or in hardware. The invention is not restricted to the details of the foregoing embodiments, which are merely exemplary of the invention. For example, the NFC reader can be an NFC-enabled mobile phone or an RF communication interface, for example. The NFC-A listen devices can be Type 1, Type 2 and Type 4A tags/cards; an NFC-enabled mobile phone emulating Kovio tag and/or NFC-A listen devices.

What is claimed is:

1. A method of connecting a near-field communication (NFC) reader to a plurality of NFC devices including at least one NFC-A device and at least one RF barcode device, comprising:
    detecting and logging the active and sleep intervals of the RF barcode device when an RF field is switched on; and
    synchronizing the transmission and reception of data to and from each NFC-A device such that transmission and reception of data to and from each NFC-A device occurs only during sleep intervals of the RF barcode device.

2. The method of claim 1, wherein detecting and logging comprises:
    switching on an RF field configured to power-up the RF barcode device; and
    listening for a response from the RF barcode device.

3. The method of claim 2, further comprising:
    detecting an RF barcode device in the RF field; and
    timing the start and end of each UID transmission by the RF barcode device.

4. The method of claim 3, further comprising storing the start and end times of the UID transmissions in a log of a memory device.

5. The method of claim 3, further comprising calculating the duration and period of the RF barcode device's UID transmissions.

6. The method of claim 1, further comprising detecting the presence of RF barcode devices prior to the detection of other NFC-A devices.

7. The method of claim 6, further comprising delaying detection of the other NFC-A devices until after expiry of a guard time.

8. The method of claim 7, further comprising, if no RF barcode devices are detected within the guard time, operating the NFC in a conventional NFC mode of operation.

9. The method of claim 7, further comprising, if an RF barcode is detected within the guard time, operating the NFC reader in a synchronous mode, whereby the exchange of data with NFC-A devices is synchronized to occur only within the intervals between successive UID transmissions of the RF barcode or barcodes.

10. The method of claim 1, further comprising:
    initiating by the NFC reader an NFC interface and switching on an RF field,
    detecting an RF barcode device powered-up by the field, and
    receiving the RF barcode device's UID;
    timing and logging the start and end of each UID transmission, and
    calculating the duration and period of the UID transmissions,
    predicting the timing of future UID transmissions by the RF barcode device based on the logged start and end times of earlier UID transmissions, and
    synchronizing the transmission and reception of data to and from the NFC-A devices to occur only during the intervals between successive UID transmissions.

11. The method of claim 10, predicting comprises interrogating the log of earlier UID transmissions and adding the interval between previously-logged UID end and start times to the end time of a UID transmission.

12. The method of claim 10, further comprising truncating the transmission of data to and from the NFC-A device or devices to fit within the UID sleep intervals.

13. The method of claim 12, further comprising adding a frame waiting time to the data transmitted to the NFC-A devices, the frame waiting time corresponding to the start of a future sleep interval of the RF barcode device, such that the NFC-A device delays the transmission of its response until a specified RF barcode device sleep interval.

14. An apparatus for connecting a near-field communication (NFC) reader to a plurality of NFC devices including at least one NFC-A device and at least one RF barcode device, comprising:
    an RF transceiver,
    a clock, and
    a processor configured to detect the RF barcode device when the RF transceiver is active and monitor the RF barcode device's UID transmissions,
    wherein the clock and processor are together configured to monitor the period and duration of the RF barcode device's UID transmissions,
    wherein the processor is further configured to poll for and exchange data with the NFC-A device only in the intervals between the end of a first, and the beginning of a second UID transmission by the RF barcode device.

15. The apparatus of claim 14, wherein the clock is triggered by the commencement and termination of the receipt of UIDs from an RF barcode device.

16. A method, comprising:
- activating an RF transceiver to energize a proximately located RF barcode device;
- receiving periodic UID transmissions from the energized RF barcode device;
- determining from the received periodic UID transmissions a sleep period of said energized RF barcode device between periodic UID transmissions;
- activating the RF transceiver to engage in communications with a proximately located NFC-A device only during the determined sleep period.

17. A near-field communication (NFC) reader, comprising:
- an RF transceiver;
- a processor configured to control operation of the RF transceiver, wherein said processor operates to:
  - activate the RF transceiver to energize a proximately located RF barcode device;
  - receive periodic UID transmissions from the energized RF barcode device;
  - determine from the received periodic UID transmissions a sleep period of said energized RF barcode device between periodic UID transmissions;
  - activate the RF transceiver to engage in communications with a proximately located NFC-A device only during the determined sleep period.

* * * * *